United States Patent [19]

Ohshima et al.

[11] Patent Number: 4,796,115
[45] Date of Patent: Jan. 3, 1989

[54] TAPE LOADING DEVICE FOR A CASSETTE TYPE TAPE RECORDING AND/OR REPRODUCING APPARATUS

[75] Inventors: Eiji Ohshima; Takao Kumagai, both of Tokyo; Hiromitsu Baba, Kanagawa, all of Japan

[73] Assignee: Sony Corporation, Tokyo, Japan

[21] Appl. No.: 866,968

[22] Filed: May 27, 1986

[30] Foreign Application Priority Data

May 27, 1985 [JP] Japan .................. 60-113781

[51] Int. Cl.$^4$ ............... G11B 15/665; G11B 15/675; G11B 5/027
[52] U.S. Cl. ............................ 360/85; 360/95
[58] Field of Search .............. 360/85, 95, 96.5, 96.6, 360/130.21, 130.22, 130.23; 242/197–199

[56] References Cited

U.S. PATENT DOCUMENTS 3,661,344  5/1972  Nakamura et al. ............ 242/199
4,642,713  2/1987  Ohira et al. ..................... 360/85

FOREIGN PATENT DOCUMENTS 4719060   7/1968  Japan ........................... 360/85
52-20006  2/1977  Japan ........................... 360/95
57-69565  4/1982  Japan ........................... 360/96.5
60-209959 10/1985 Japan ........................... 360/96.6
8403790   9/1984  PCT Int'l Appl. .......... 360/130.21

Primary Examiner—Stuart N. Hecker
Assistant Examiner—Benjamin E. Urcia
Attorney, Agent, or Firm—Hill, Van Santen, Steadman & Simpson

[57] ABSTRACT

In a cassette type recording and/or reproducing apparatus, such as an 8-mm VTR with a built-in camera, in which a tape cassette is so installed on a chassis as to have a pair of tape reels therein engaged with a pair of reel disks and then, a tape is drawn from the tape cassette by a tape loading means so as to be wound around a rotary head drum, the tape cassette is moved together with the reel disks toward the rotary head drum, after placed on the chassis on which the reel disks are provided, so that it becomes easy to make the cassette type recording and/or reproducing apparatus compact, while maintaining high tape-running stability and high recording and reproducing precisions.

9 Claims, 9 Drawing Sheets

TAPE LOADING DEVICE FOR A CASSETTE TYPE TAPE RECORDING AND/OR REPRODUCING APPARATUS

BACKGROUND OF THE INVENTION

1. Field of the Invention

The present invention relates to a tape loading device of a cassette type recording and/or reproducing apparatus suitable for a compact 8-mm VTR with a built-in camera, wherein a tape drawn from a tape cassette is wound around a rotary head drum for recording thereon or reproducing therefrom.

2. Description of the Prior Art

In a conventional cassette type VTR, a tape cassette is mounted on a chassis in such a way that a pair of tape reels are engaged with a pair of reel disks, and then a tape is drawn from the tape cassette by tape loading means to wind the tape around a rotary head drum and thereafter, recording or reproducing takes place by the rotary head drum while the tape moves at constant speed along its running path. That is, the tape cassette must be located on the chassis at some distance from the rotary head drum, lest the tape cassette, the tape in the tape cassette or the like should unexpectedly come in contact with a rotary drum located at the top of the rotary head drum.

However, placing the tape cassette at a sufficient distance from the rotary head drum prevents the VTR from being made compact. In order to make the VTR compact, it is, therefore, important to minimize the distance between the tape cassette and the rotary head drum.

In order to overcome this problem, it has been proposed to move the rotary head drum so as to bring it near the tape cassette after the tape cassette is installed on the chassis. But the rotary head drum is such an important component of the VTR that it is made with considerable accuracy, on the order of several microns. Therefore, if such a construction were adopted in a practical VTR, unstable factors in tape running are enhanced, and recording and/or reproducing precisions are degraded. Hence, the construction as mentioned above has not been used in a practical VTR.

In the present invention, it is possible to decrease the distance between the rotary head drum and the tape cassette mounted on the chassis, while maintaining stable tape running and high recording or reproducing precision, so as to make a compact VTR.

SUMMARY OF THE INVENTION

According to a first aspect of the present invention, a tape loading device comprises a fixed chassis on which a rotary head drum is mounted, and a slidable chassis on which a pair of reel disks are mounted, wherein the slidable chassis is slidably mounted on the fixed chassis so that the pair of reel disks can be moved toward or away from the rotary head drum; after a tape cassette is installed on the movable chassis and a pair of tape reels therein engage the pair of reel disks, the tape casette is moved by means of the slidable chassis toward the rotary head drum; and a tape in the tape cassette is wound around the rotary head drum by a tape loading means.

According to a second aspect of the present invention, a tape loading apparatus comprises a fixed chassis on which a rotary head drum is mounted, and a slidable chassis on which a pair of reel disks and a pair of guide rails for guiding tape loading means are arranged, wherein the slidable chassis is slidably mounted on the fixed chassis so that the pair of reel disks can be moved toward or away from the rotary head drum; after a tape cassette is installed on the slidable chassis and the pair of tape reels therein are engaged with the pair of reel disks, the tape cassette is moved by means of the slidable chassis toward the rotary head drum; and a tape in the tape cassette is wound around the rotary head drum by the tape loading means guided by the guide rails.

According to another aspect of the present invention, a tape cassette is initially placed at a sufficient distance from a rotary head drum, so that the tape cassette or a tape therein does not contact the rotary head drum and they are not damaged by each other.

Furthermore, in the present invention, the rotary head drum is immovable, fixed in position, and the pair of reel disks and the tape cassette mounted thereon are moved toward the rotary head drum by a slidable chassis. The distance between the tape cassette and rotary head drum can be greatly decreased during normal operation despite maintaining high tape-running stability and high recording and reproducing precisions. Therefore, the total size of the cassette type recording and/or reproducing apparatus can be reduced from that of the conventional apparatus.

In addition, since tape loading means, which are provided on a slidable chassis and are moved integrally therewith, are guided by guide rails while the tape cassette is moved by the slidable chassis, positioning of the tape loading means with respect to the moving tape cassette can be accurately defined, and a length of the guide rail can be greatly decreased. Therefore, when the tape cassette is mounted on the slidable chassis, the tape in the tape cassette will no longer be damaged due to interference of the tape loading means or due to an unnecessary withdrawal force of the loading means.

According to the present invention, when the guide rails arranged on the slidable chassis are formed of a synthetic resin, the tape loading means can be moved smoothly along the guide rails with a small torque, and thus a motor for driving the tape loading means is compact in size.

BRIEF DESCRIPTION OF THE DRAWINGS

The drawings show an embodiment of the present invention, in which.

DESCRIPTION OF THE PREFERRED EMBODIMENT

An embodiment of the present invention will now be described with reference to the accompanying drawings. In this embodiment, the present invention is applied to an 8-mm VTR.

Figure 6:
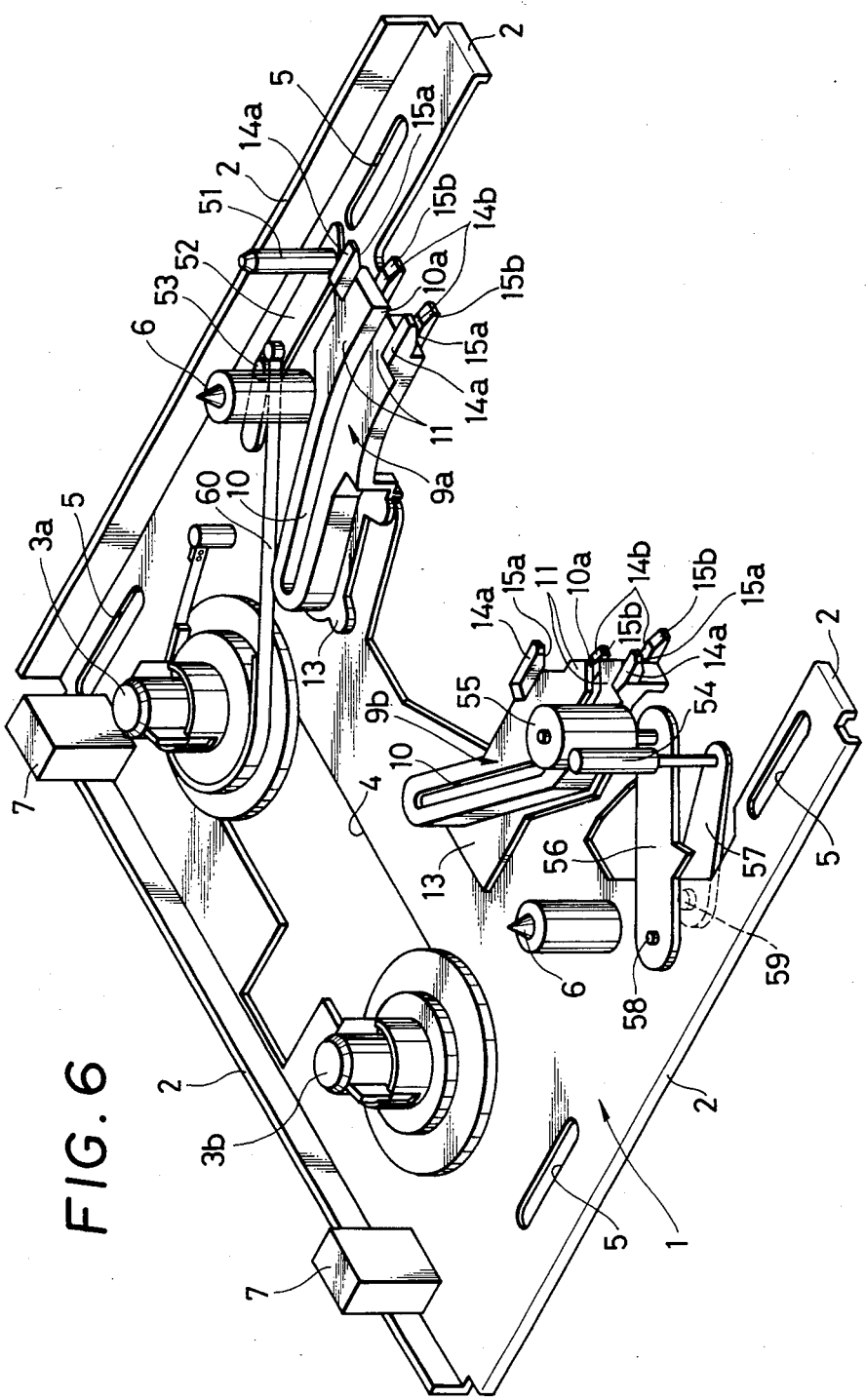
FIG. 6 is a perspective view of a slidable chassis.

As illustrated in FIG. 6, a slidable chassis 1 is formed of a metal plate, such as stainless steel plate and reinforced by a plurality of ribs 2, that is, by the bent peripheries of the metal plate so as to obtain a plate which has highly precise flat-surfaces. A pair of reel disks, a supply reel disk 3a and a take-up reel disk 3b, are rotatably mounted on the upper rear end portion of the slidable chassis 1. An opening 4, in which a mechanism for driving the reel disks (to be described later) is arranged, is formed between the reel disks 3a and 3b. Guide slots 5 extending in the front to rear direction are formed in the four corner portions of the slidable chassis 1 in parallel with one another. A pair of cassette positioning pins 6 and a pair of cassette mounting bases 7 are provided on the upper surface of the slidable chassis 1.

Next, the construction of guide rails will be described with reference to FIGS. 6 to 9.

A pair of guide rails 9a and 9b for guiding tape loading means 27a and 27b (to be described later) are mounted on the front end portion of the slidable chassis 1. These guide rails 9a and 9b are molded on the slidable chassis 1 of the metal plate by using a synthetic resin, such as polyacetal resin. Curved guide grooves 10 are formed at the respective central portions of the guide rails 9a and 9b, and distal ends (front ends) 10a of the guide grooves 10 are opened at the front end portions 11 of the guide rails 9a and 9b. The base portions 13 of the guide rails 9a and 9b are molded along inner surfaces of grooves 12 formed in the slidable chassis 1, and the guide grooves 10 are positioned at certain levels higher than those of the base portions 13. The base portions 13 are secured to the slidable chassis 1 with upper and lower flanges 13a between which the slidable chassis 1 is sandwiched, and a plurality of connecting pins 13b, which vertically extend through the slidable chassis 1, are spaced away from one another. Note that when the guide rails 9a and 9b are molded on the slidable chassis 1, the number of assembling steps can be reduced and the former is no longer loosened or disengaged from the latter.

A pair of upper and lower pawls 14a and 14b are formed integrally with the respective guide rails 9a and 9b at their end portions 11 and at each side of the distal ends 10a of the guide grooves 10. Further, inclined planes 15a and 15b are formed in the respective opposing surfaces of the distal ends of the pawls 14a and 14b.

Next, a drive mechanism for driving the slidable chassis and the tape loading means will be described with reference to FIGS. 1 to 5.

Figure 1:
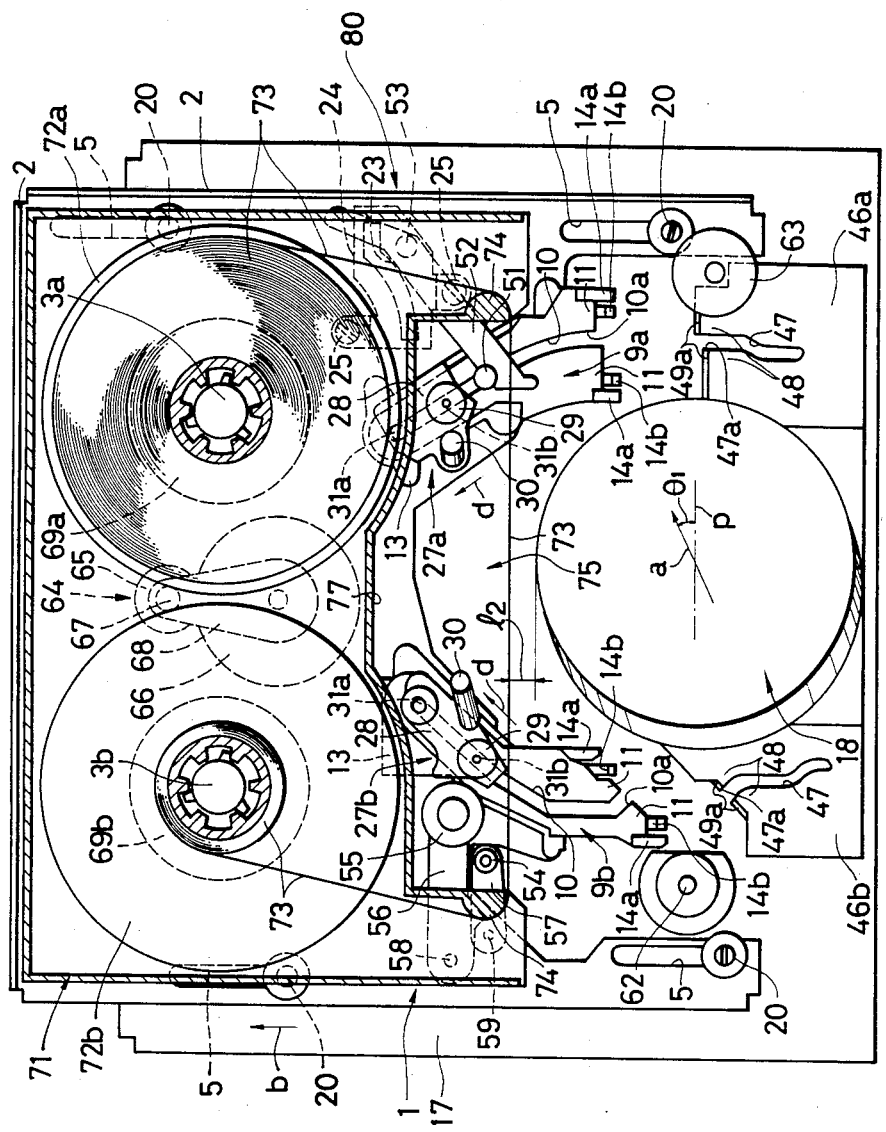
FIGS. 1 and 2 are plan views of a main part of the device according to an embodiment of the present invention.
Figure 4:
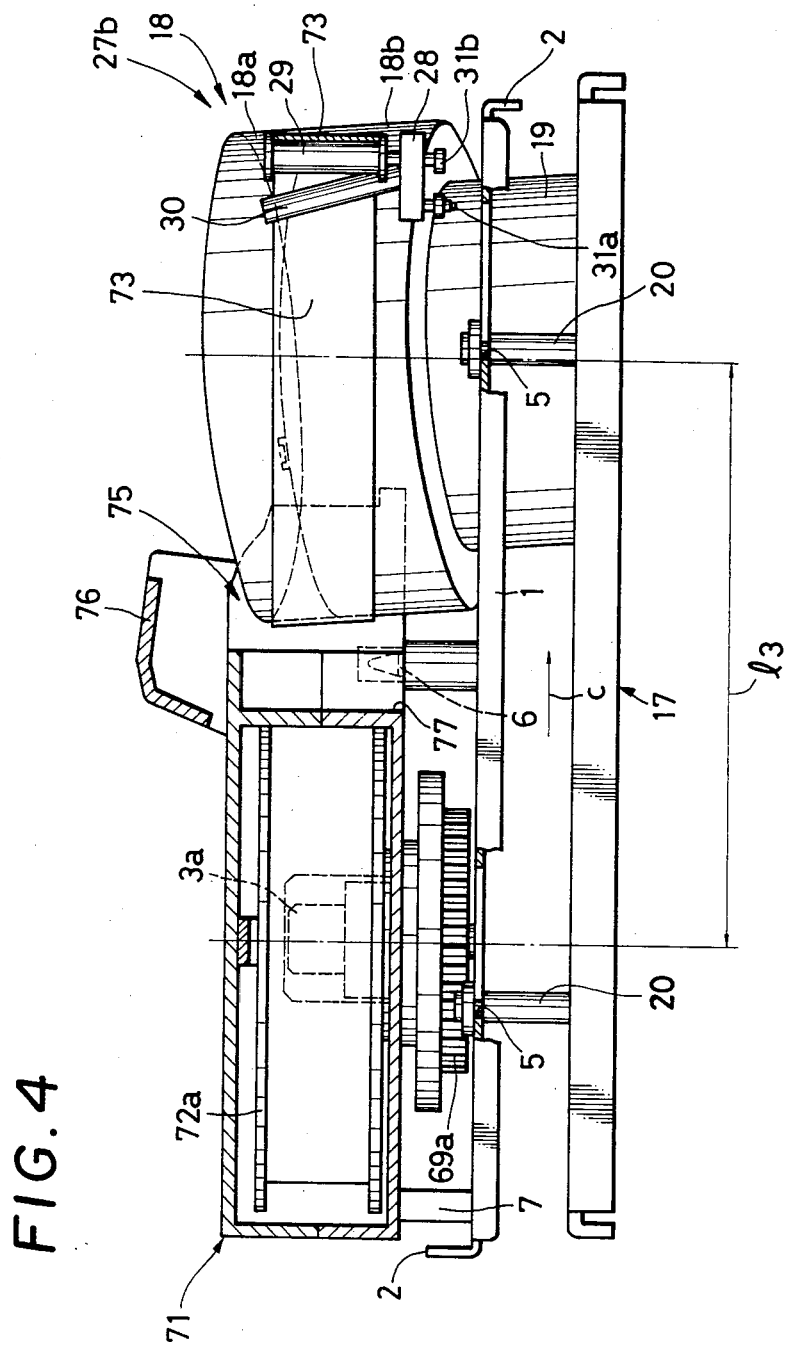
Figure 5:
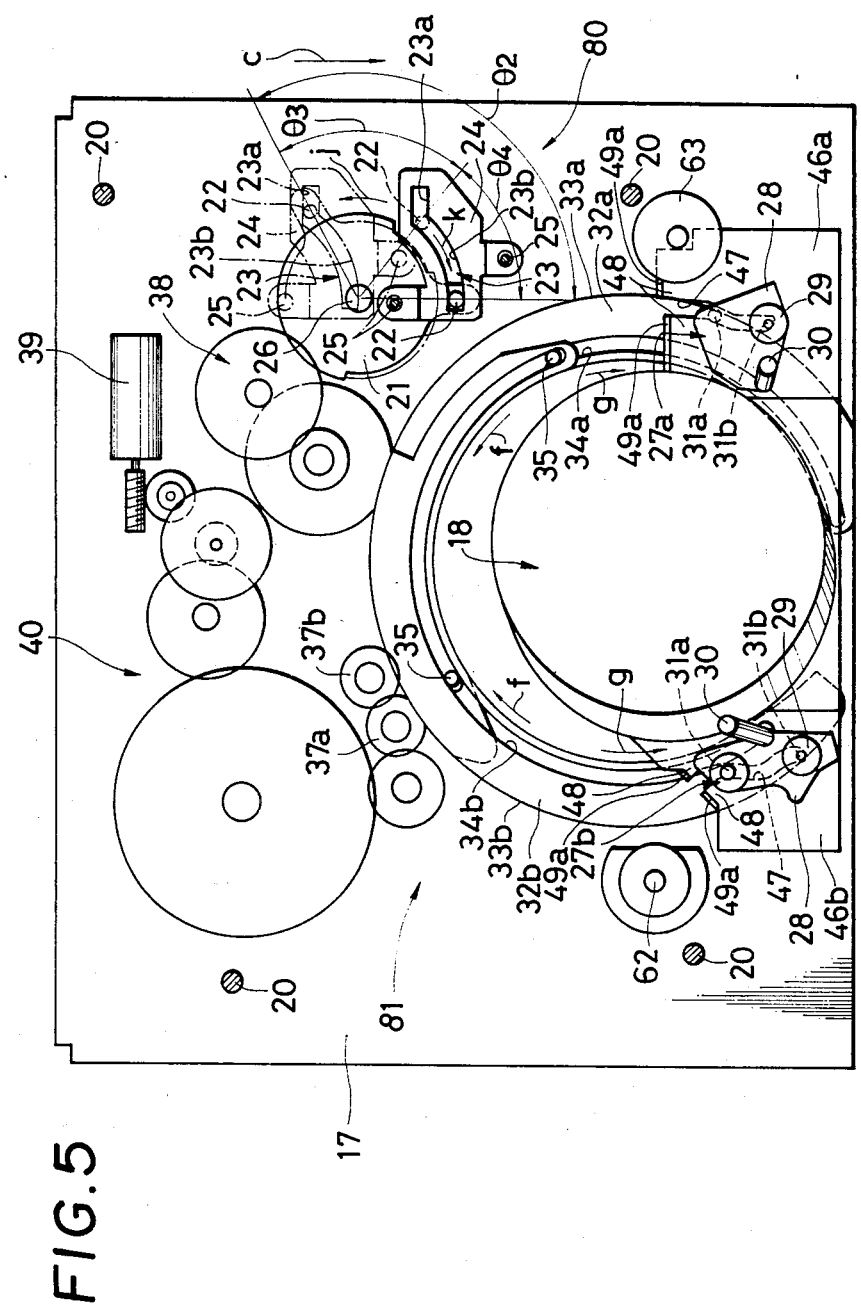
FIG. 5 is a plan view of a fixed chassis.

The chassis drive mechanism 80 is arranged as shown in FIGS. 1 and 5. A fixed chassis 17 is formed of a metal, such as aluminum. Mounted on the upper front end portion of the fixed chassis 17 through a drum base 19 is a rotary head drum 18, the upper and the lower drums 18a, 18b of which are a rotary drum and a fixed drum, respectively. The fixed drum 18b is fixed to the drum base 19. As shown in FIG. 1, the rotary head drum 18 forms a predetermined angle $\theta_1$ in the direction of arrow a with a reference line P which is parallel to the front surface of a tape cassette (to be described later). Four guide pins 20 extend from the upper portion of and near the respective corner positions of the fixed chassis 17, and the guide slots 5 of the slidable chassis 1 engage with the respective upper ends of the guide pins 20, whereby the slidable chassis is held parallel to the fixed chassis 17. The slidable chassis 1 is horizontally moved in the direction of arrow b (FIGS. 1 and 3) or c (FIGS. 2 and 4) toward or away from the rotary head drum 18 under a guidance of the four combinations of the guide pins 20 and guide slots 5.

A partially toothed gear 21 is rotatably supported on the upper portion of the fixed chassis 17, and a pin 22 is eccentrically secured on the gear 21 as shown in FIG. 5. A guide plate 24 with a guide slot 23, to which the drive pin 22 is inserted from below, is fixed to the lower surface of the slidble chassis 1 with a plurality of screws 25. The guide slot 23 consists of a linear part 23a perpendicular to the moving direction of the slidable chassis 1 indicated by arrows b and c and a curved part 23b, the center of which coincides with the axis 26 of the drive gear 21.

Figure 7:
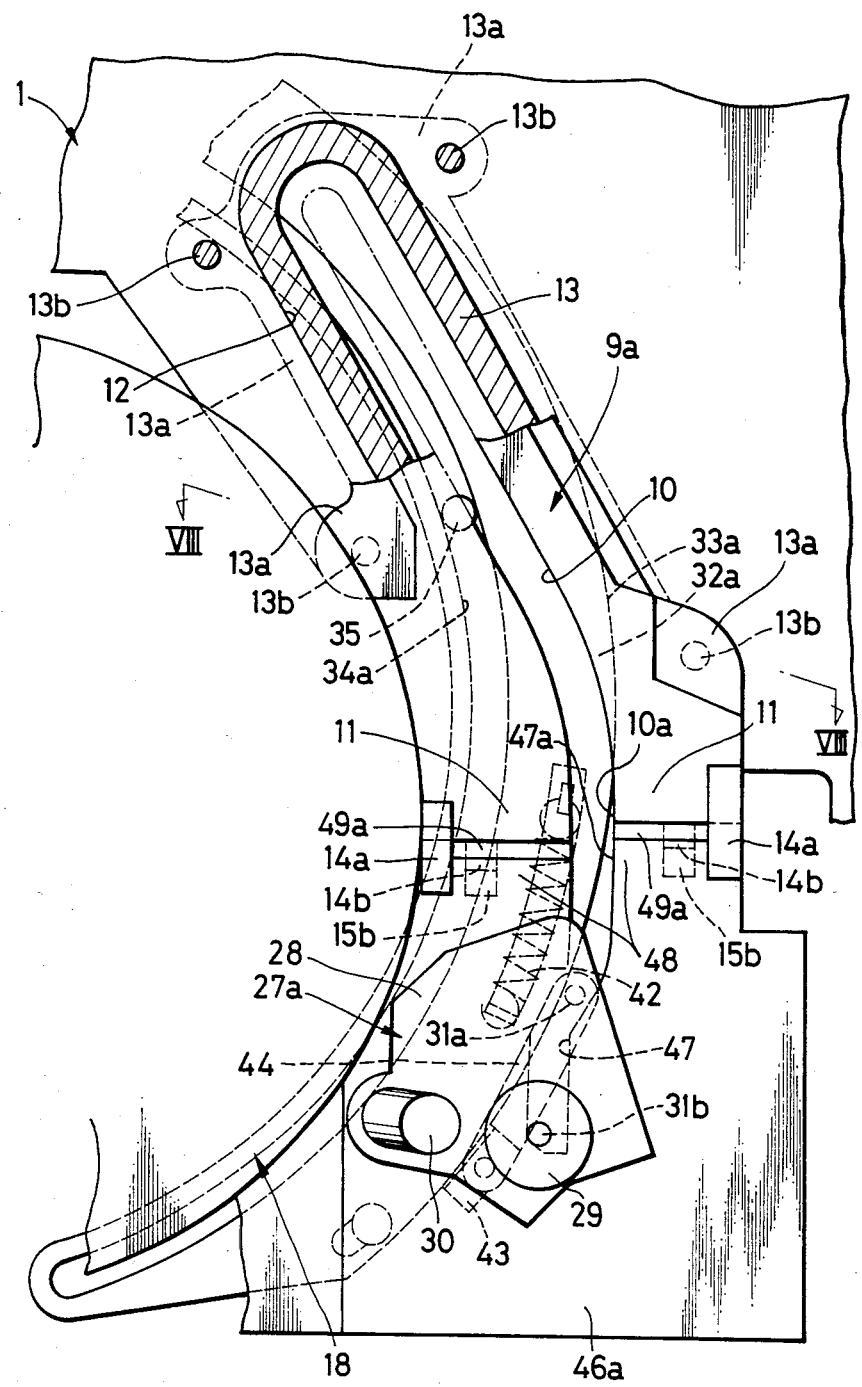
FIG. 7 is a partially enlarged plan view of the slidable chassis.
Figure 8:
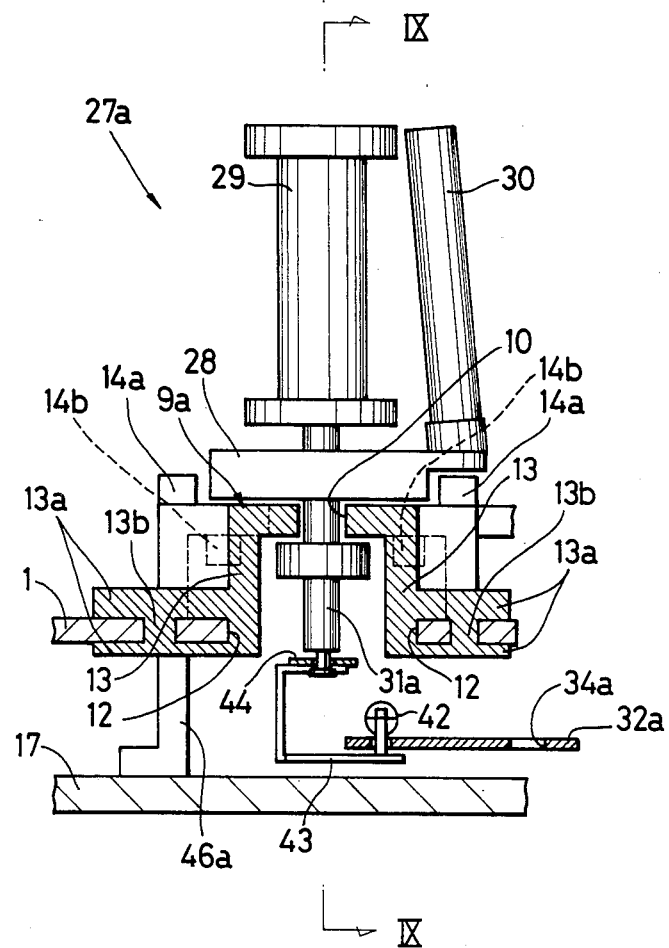
FIG. 8 is a sectional view taken along a line VIII—VIII in FIG. 7.
Figure 9:
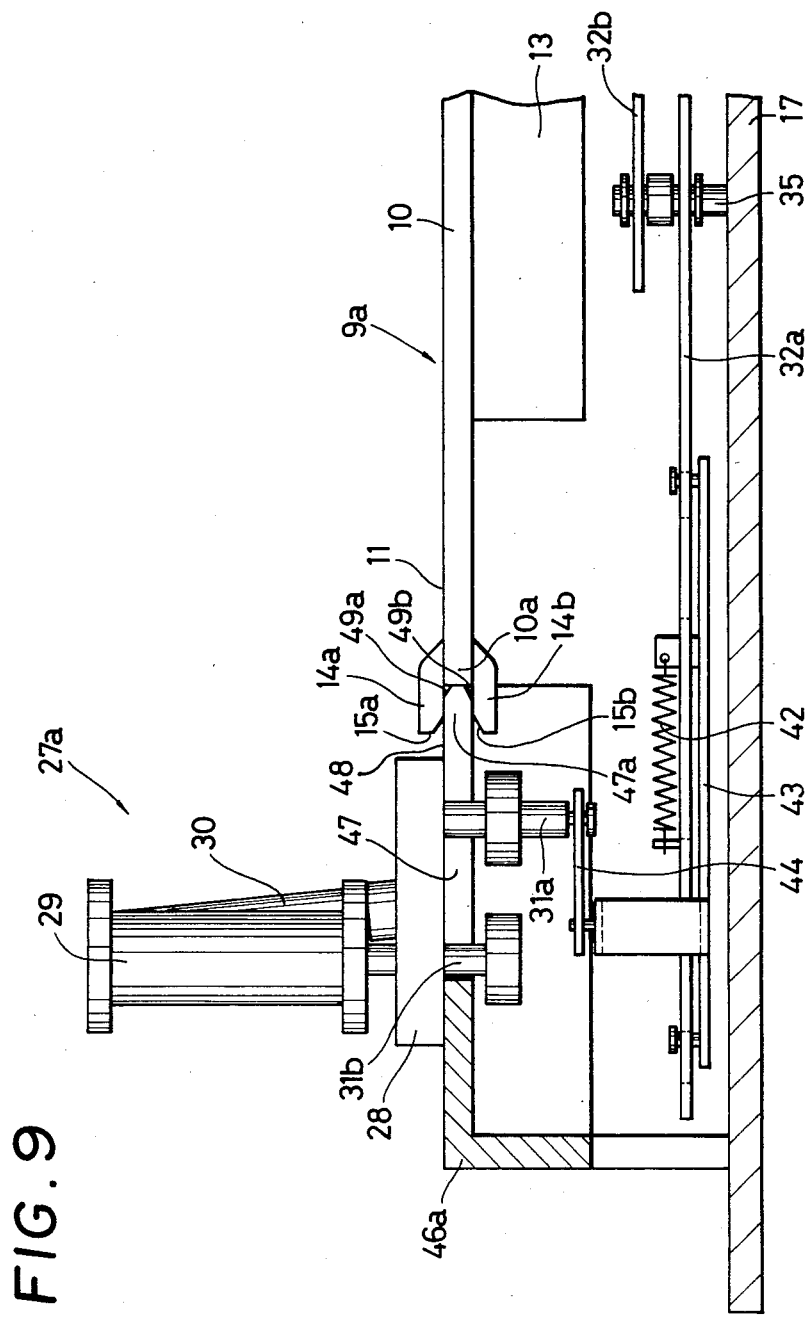
FIG. 9 is a sectional view taken along a line IX—IX of FIG. 8.

A drive mechanism 81 for moving the tape loading means 27a and 27b has the following arrangement. Each of the tape loading means 27a and 27b has a vertical roller guide 29, which consists of a roller and an inclined guide 30, which consists of a fixed pin, and they are mounted on a movable block 28. As shown in FIGS. 7 to 9, a pair of guide pins 31a and 31b are disposed on the lower surface of the movable block 28. As the movable blocks 28 of the tape loading means 27a and 27b are placed on the respective guide rails 9a and 9b, the loading means 27a and 27b are moved under the guidance of the combination of the guide pins 31a, 31b and guide grooves 10 in the direction of arrow d in FIG. 1 or arrow e in FIG. 2 so as to move toward or away from the rotary head drum 18.

A pair of semi-arcuate drive plates 32a and 32b vertically overlap each other and are symmetrically arranged on the upper portion of the fixed chassis 17 and near the outer periphery of the rotary head drum 18 as shown in FIG. 5. The drive plates 32a and 32b have peripheral teeth 33a and 33b and arcuate guide slots 34a and 34b, respectively. A pair of guide pins 35 fixed to the fixed chassis 17 are inserted in the guide slots 34a and 34b. Thus, the drive plates 32a and 32b are movable in the direction of arrow f or g.

Rotatably supported on the upper portion of the fixed chassis 17 are a pair of gears 37a and 37b which are in mesh with the respective peripheral teeth 33a and 33b. A gear train 38 transmits torque between the gear 21 and peripheral teeth 33a of the drive plate 32a. A drive motor 39 is mounted on the upper portion of the fixed chassis 17, and a gear train 40 for transmitting torque is interposed between the motor 39 and gear 37a.

As shown in FIGS. 7 to 9, one of the guide pins 31a of the tape loading means 27a, 27b is connected to the drive plate 32a, 32b through a spring 42, a slider 43, a link 44, etc. When the drive plates 32a and 32b are driven in the direction of arrow f or g in FIG. 5, the tape loading means 27a and 27b are moved in the respective directions of arrow d in FIG. 1 and arrow e in FIG. 2 through the springs 42, etc. under the guidance of the guide rails 9a and 9b.

As shown in FIGS. 1, 2 and 5, or FIGS. 7 to 9, a pair of positioning stands 46a and 46b for positioning the tape loading means 27a and 27b are arranged at the right and left sides of the base 19 of the rotary head drum 18. A pair of guide grooves 47 are formed in the respective positioning stands 46a and 46b and open distal ends (rear ends) 47a of the guide grooves 47 are connected to the respective distal ends 10a of the guide grooves 10. That is, the front end portions 11 of the guide rails 9a and 9b are connected to respective distal end portions 48 of the positioning plates 46a and 46b as shown in FIGS. 7 and 9. Inclined planes 49a and 49b are formed on the upper and lower edges of the distal end portions 48 opposite to the inclined planes 15a and 15b of the pawls 14a and 14b.

As shown in FIG. 6, a tension detecting pin 51 is pivotally mounted on the front end portion of one side of the slidable chassis 1 through an arm 52 and a pivot 53. A tape drawing pin 54 and a pinch roller 55 are pivotally mounted on the front end portion of the other side of the slidable chassis 1 through respective arms 57 and 56 and respective pivots 59 and 58. The tension detecting pin 51 is connected to a band brake 60, which is mounted on the slidable chassis 1 to adjust a brake force of the supply reel disk 3a.

Figure 2:
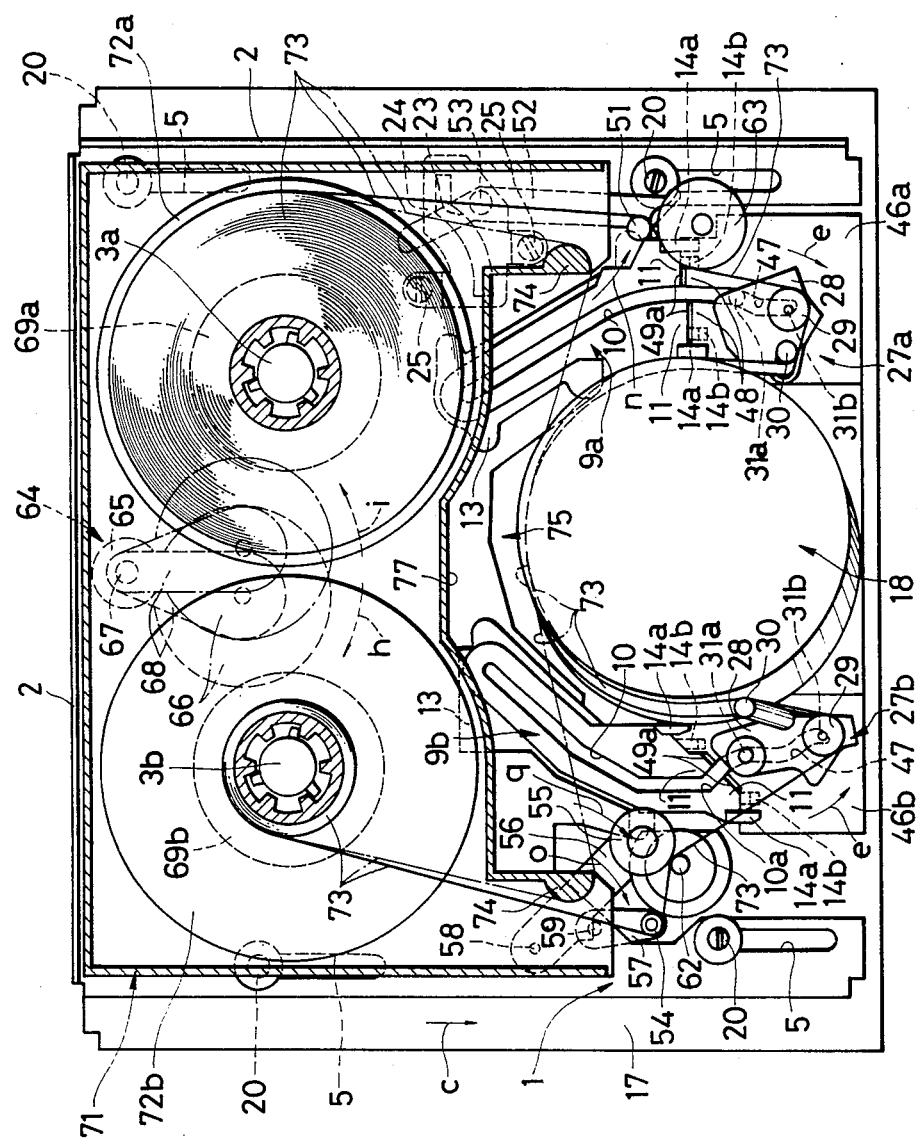

As shown in FIGS. 1 and 2, a capstan 62 and an impedance roller 63 are rotatably mounted on the fixed chassis 17 at the respective right and left sides of the rotary head drum 18. A reel disk driving mechanism 64 is mounted on the fixed chassis 17 in the intermediate position between the reel disks 3a and 3b. The driving mechanism 64 comprises a gear 65, a swing gear 66 always meshed with the gear 65, and a lever 68 rotatably supported by the axis 67 of the gear 65. The swing gear 66 is rotatably supported at the distal end of the lever 68. The driving mechanism 64 is arranged in the opening 4 of the slidable chassis 1. When the gear 65 is driven in the normal or the reverse direction by a motor (not shown) for driving the capstan 62, the swing gear 66 swings in the direction of arrow h or i as shown in FIG. 2 in accordance with the rotational direction of the gear 65, and is selectively meshed with gear 69b or 69a formed integrally with the respective reel disks 3b or 3a, so that either of the gears 69a and 69b is selectively driven as shown in FIG. 2.

As shown in FIGS. 1 and 2, a tape (magnetic tape) 73 wound around a supply reel 72a and take-up reel 72b is housed in a tape cassette (8-mm VTR cassette) 71. The tape 73 is first guided by a pair of tape guides 74 in the tape cassette 71 to travel along a front opening 75 thereof. The tape cassette 71 has a cover 76 for opening/closing the opening 75 and a bottom cutout 77 communicating with the opening 75 as shown in FIGS. 3 and 4.

Tape loading and tape unloading operations will now be explained with reference to FIGS. 1 to 9.

Figure 3:
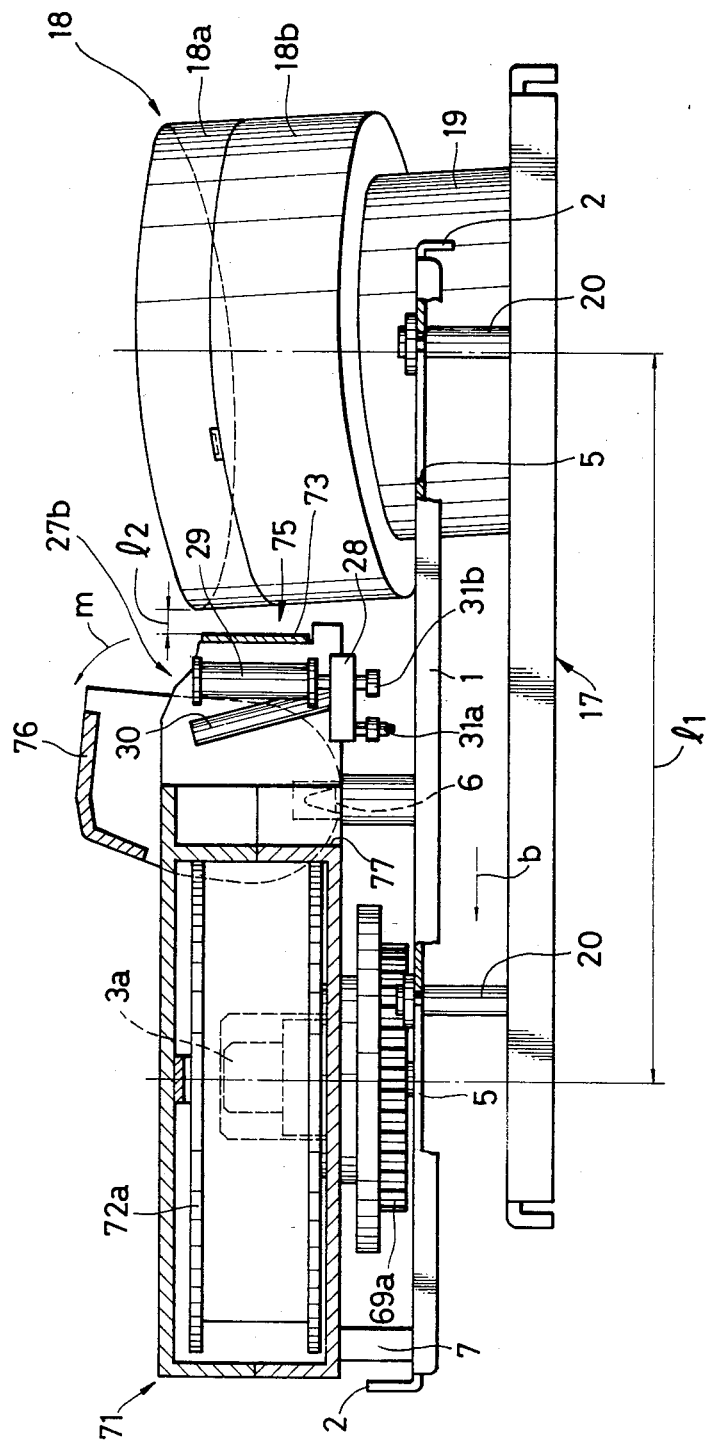
FIGS. 3 and 4 are side views of the main part thereof.

Before the cassette 71 is installed, the slidable chassis 1 is moved in the direction of arrow b toward an inactive position shown in FIGS. 1 and 3, so that the reel disks 3a and 3b are separated from the rotary head drum 18 by a large distance $l_1$. In the inactive position, the pin 22 of the gear 21 is moved in the direction of arrow j toward an inactive position indicated in chain-dotted lines in FIG. 5 and located in the linear part 23a of the guide slot 23 in the guide plate 24. Further, the tape loading means 27a and 27b, the tension detecting pin 51, the tape drawing pin 54 and the pinch roller 55 are moved toward the inactive positions shown in FIG. 1.

In this state, as shown in FIG. 3, when the tape cassette 71 is installed on the slidable chassis 1 by a cassette mounting device (not shown) and supported on the two cassette positioning pins 6 and the two cassette mounting bases 7, the tape loading means 27a and 27b, the tension detecting pin 51, the tape drawing pin 54 and the pinch roller 55 are inserted inside the tape 73 through the bottom cutout 77 of the tape cassette 71. The cover 76 is pushed upward by an opening means (not shown) to pivot in the direction of arrow m in FIG. 3, so that the front opening 75 of the tape cassette 71 is opened.

Under the above-mentioned state, the tape cassette 71 is so placed on the slidable chassis 1 as to have the tape 73 thereof sufficiently separated by a distance $l_1$ from the rotary head drum 18, and thereby not only the tape cassette 71 but also the tape 73 no longer unexpectedly contact the rotary drum head 18, particularly the upper drum 18a, i.e., the rotary drum.

The tape loading operation is performed through driving the drive motor 39 in the normal direction after the cassette 71 is installed. That is, when the motor 39 is rotated in the normal direction, the gears 37a and 37b rotate in opposite directions through the gear train 40 as shown in FIG. 5, and the drive plates 32a and 32b are driven in the directions of arrow g by the gears 37a and 37b. Further, the gear 21 is driven by the peripheral teeth 33a of the plate 32a through the gear train 38, so that the pin 22 is rotated by a predetermined angle $\Theta_2$ in the direction of arrow k as shown in FIG. 5.

While the pin 22 rotates from the inactive position indicated by chain-dotted lines to an intermediate position indicated by dotted lines in FIG. 5 by angle $\theta_3$, the pin 22 pushes the linear part 23a of the guide slot 23 in the guide plate 24 in the direction of arrow c. As a result, the slidable chassis 1 is driven by the pin 22 and moved from the inactive position in FIGS. 1 and 3 to an active position shown in FIGS. 2 and 4 in the direction of arrow c. After the slidable chassis 1 reaches the active position, the pin 22 moves along the curved part 23b of the guide slot 23 in the direction of arrow k from the intermediate position to the active position indicated by solid lines in FIG. 5 by the rest $\theta_4$ of angle $\theta_2$.

The reel disks 3a and 3b with the tape cassette 71 are moved in the direction of arrow c by the slidable chassis 1, so that the distance between the reel disks 3a and 3b and the rotary head drum 18 is shortened to a small distance $l_3$. Then, the tape cassette 71 approaches the rotary head drum 18. As the tape 73 is so close to the rotary head drum 18 as to be partially inserted in the tape cassette 71 from the opening 75, the tape 73, which travels linearly between the tape guides 74, is brought into partial contact with the outer surface of the rotary head drum 18 as indicated by chain-dotted lines in FIG. 2.

The guide rails 9a and 9b are moved together with the slidable chassis 1, and approach the two sides of the rotary head drum 18 as shown in FIGS. 2, 7 and 9, so that the front end portion 11 of the guide rail 9a, 9b is connected to the distal end portion 48 of the positioning stand 46a, 46b. In other words, the guide grooves 10 and 47 communicate with each other through their distal ends 10a and 47a. The guide rails 9a and 9b are formed of a synthetic resin and have an appropriate elasticity. The four pawls 14a and 14b of the guide rails 9a and 9b are guided by the inclined planes 49a and 49b of the distal end portions 48 of the positioning stands 46a and 46b and engaged with the upper and lower edges of the distal end portions 48. Hence, the guide rails 9a and 9b are reliably connected to the positioning plates 46a and 46b.

Meanwhile, as the slidable chassis is moved in the direction of arrow c, the tape loading means 27a and 27b are moved in the direction of arrow e by the drive plates 32a and 32b, which are driven in the direction of arrow g in FIG. 5 from the inactive positions shown in FIGS. 1 and 3 to the active positions near the two sides of the rotary head drum 18 as shown in FIGS. 3 and 4. That is, the tape loading means 27a and 27b are moved in the direction of arrow e along the respective guide rails 9a and 9b, which are moved in the direction of arrow c together with the slidable chassis 1. The tape loading means 27a and 27b are moved near to the distal ends of the guide rails 9a and 9b, while the drive pin 22 moves in the direction of arrow k by angle $\theta_3$, and are transferred from the guide rails 9a and 9b to the positioning stands 46a and 46b, while the pin 22 moves by angle $\theta_4$. When the tape loading means 27a and 27b reach the active positions, the movable blocks 28 are mounted on the respective positioning stands 46a and 46b, and the guide pins 31a and 31b are fitted in the respective guide grooves 47. The tape loading means 27a and 27b are positioned in the active positions by bias forces of the springs 42. Although the roller guides 29 of the tape loading means 27a and 27b stand vertically in the active positions, the inclined guides 30 are at predetermined angles against the rotary head drum 18. Further, as the guide rails 9a and 9b are formed of a synthetic resin and a friction coefficient thereof is lower than that of a metal, the tape loading means 27a and 27b can be moved smoothly along the guide rails 9a and 9b with small torque, and the motor 39 can be made compact.

The tape 73 in the tape cassette 71 is drawn from the front opening 75 by the vertical roller guides 29 of the tape loading means 27a and 27b, and helically wound substantially in the shape of the letter M around the inclined rotary head drum 18 as shown in FIGS. 2 and 4. The contact angle and helical angle of the tape 73 against the rotary head drum 18 are defined by the inclined guides 30 of the tape loading means 27a and 27b, and further, the inclined guides 30 serve to define the path of the tape 73 between the rotary head drum 18 and tape cassette 71. In addition, the tension detecting pin 51, the tape drawing pin 54 and the pinch roller 55 are driven at a period synchronous with the movement of the slidable chassis 1, which is moved in the direction of arrow c by another driven mechanism (not shown), to be moved in the directions of arrows n, o and q from the inactive positions shown in FIG. 1 to the active positions shown in FIG. 2, so that the tape 73 passes between the impedance roller 63 and the capstan 62. Thus, the tape loading operation is finished and the motor 39 is stopped.

During this operation, the swing gear 66 of the reel disk driving mechanism 64 is positioned in an intermediate position between the gears 69a and 69b formed integrally with the respective reel disks, and meshed with neither of the gears 69a and 69b. At the time of tape loading, the tape 73 is generally paid out from the take-up reel 72b of the tape cassette 71.

After completion of the tape loading operation, the tape 73 is pressed against the capstan 62 by the pinch roller 55 as shown in FIG. 2 and run under constant speed along the loading path, so that the tape 73 is paid out from the supply reel 72a and taken up by the take-up reel 72b, and recording and reproducing are performed by rotation of the upper drum 18a of the rotary head drum 18. During the recording/reproducing mode, the tension of the tape 73 is detected by the tension detecting pin 51, and the brake force of the band brake 60 of the supply reel disc 3a is automatially adjusted to make the back tension of the tape 73 constant. In the recording/reproducing or fast forward mode, the gear 65 of the reel disk driving mechanism 64 is rotated in the normal direction, and the swing gear 66 swings in the direction of arrow h indicated in broken lines in FIG. 2 to be meshed with the gear 69b formed integrally with the take-up reel disk 3b, so that the reel disk 3b is rotated. On the other hand, in a rewind mode, the gear 65 is rotated in the reverse direction, and the swing gear 66 swings in the direction of arrow i indicated in chain-dotted lines in FIG. 2 to mesh with the gear 69a formed integrally with the supply reel disk 3a, so that the reel disk 3a is rotated.

In the meantime, the unloading operation of the tape is conducted by reversing the direction of rotation of the motor 39, in other words, through almost reversing the above-mentioned loading opeation of the tape, until the tape loading means 27a, 27b are transferred from the positioning stands 46a, 46b to the guide rails 9a, 9b after the drive plates 32a, 32b begin to move in the direction of arrow f in FIG. 5, the slidable chassis 1 is not moved in the direction of arrow b, because the pin 22 of the gear 21 is guided in the direction of arrow j in FIG. 5 by the curved part 23b of the guide slot 23. After the tape loading means 27a and 27b are mounted on the guide rails 9a and 9b, the pin 22 is guided by the linear part 23a of the guide slot 23, and thereby the slidable chassis 1 is moved in the direction of arrow b from the active position shown in FIGS. 2 and 4 to the inactive position shown in FIGS. 1 and 3.

The tape cassette 71 is moved together with the reel disks 3a and 3b in the direction of arrow b by the slidable chassis 1 and separated by the sufficient distance $l_2$ from the rotary head drum 18 as shown in FIGS. 1 and 4. After the tape loading means 27a and 27b, the tension detecting pin 51, the tape drawing pin 54, and the pinch roller 55 are moved to the inactive positions shown in FIG. 1, the motor 39 is stopped. Thus, the tape unloading operation is finished. During the unloading operation, the swing gear 66 meshes with the gear 69a formed integrally with the take-up reel disk 3b as indicated in dotted lines in FIG. 2, so that the take-up reel disk 3b is driven with small torque. The tape 73 is then wound on the take-up reel 7b and withdrawn in the tape cassette 71.

The present invention is not limited to the particular embodiment mentioned above. Various changes and modifications may be made within the spirit and scope of the invention. For example, in the embodiment, the slidable chassis 1 is formed of a metal plate, and the guide rails 9a and 9b formed of a synthetic resin are molded on the metal plate. However, they can be molded integrally with each other by a synthetic resin of high strength.

The present invention is not limited to an 8-mm VTR with a built-in camera, but applied to various other cassette type recording and/or reproducing apparatus.

Although the invention has been described with respect to preferred embodiments, it is not to be so limited as changes and modifications can be made which are within the full intended scope of the invention as defined by the appended claims.

We claim as our invention:

1. A tape loading device for a cassette type tape recording and/or reproducing apparatus comprising:
    a main chassis on which a rotary head drum is mounted;
    a sub-chassis slidably mounted on said main chassis for carrying a tape cassette;
    a chassis drive mechanism arranged between said main chassis and said sub-chassis so as to move said sub-chassis towards said rotary head drum;
    tape loading means movable from said sub-chassis to said main chassis for drawing tape out from a tape cassette and guiding said tape on the periphery of said rotary head drum;

guide rail means on said sub-chassis is for guiding movement of said tape loading means therealong; and positioning means on said main chassis for cooperation with said guide rail means to transfer said tape loading means between said sub-chassis and main chassis and for positioning said tape loading means with respect to said rotary drum head;

said positioning means including coupling means for coupling said guide rail means to said positioning means.

2. The tape loading device as claimed in claim 1, wherein:

said tape loading means are constructed in pairs, said drum head having sides, and said loading means adapted to be moved along the respective sides of said rotary head drum.

3. The tape loading device as claimed in claim 1, wherein:

said tape loading means is driven by a drive mechanism provided on said main chassis.

4. The tape loading device as claimed in claim 3, wherein:

said drive mechanism has a pair of drive plates provided on said main chassis.

5. The tape loading device as claimed in claim 1, wherein:

said positioning means are constructed in pairs and provided on the respective sides of said rotary head drum as each of said positioning means corresponds to each of said guide rail means.

6. The tape loading device as claimed in claim 5, wherein:

said positioning means have respective guide grooves so as to position said respective tape loading means.

7. A tape loading device for a cassette type tape recording and/or reproducing apparatus comprising:

a main chassis on which a rotary head drum having sides is mounted;

a sub-chassis slidably mounted on said main chassis for carrying a tape cassette;

a chassis drive mechanism arranged between said main chassis and said sub-chassis so as to move said sub-chassis towards said rotary head drum;

tape loading means movable from said sub-chassis to said main chassis for drawing tape out from a tape cassette and guiding said tape on the periphery of said rotary head drum and wherein:

guide rail means on said sub-chassis for guiding movement of said tape loading means therealong;

positioning means on said main chassis for cooperation with said guide rail means to transfer said tape loading means between said sub-chassis and main chassis and for positioning said tape loading means with respect to said rotary drum head; and said guide rail means are constructed in pairs and provided along the respective sides of said rotary head drum.

8. The tape loading device as claimed in claim 7, wherein:

said pair of guide rail means have respective guide grooves so as to guide said respective tape loading means.

9. A tape loading device for a cassette type tape recording and/or reproducing apparatus comprising:

a main chassis on which a rotary head drum is mounted;

a sub-chassis slidably mounted on said main chassis for carrying a tape cassette;

a chassis drive mechanism arranged between said main chassis and said sub-chassis so as to move said sub-chassis towards said rotary head drum;

tape loading means movable from said sub-chassis to said main chassis for drawing tape out from a tape cassette and guiding said tape on the periphery of said rotary head drum;

guide rail means on said sub-chassis for guiding movement of said tape loading means therealong;

positioning means on said main chassis for cooperation with said guide rail means to transfer said tape loading between said sub-chassis and main chassis and for positoning said tape loading means with respect to said rotary drum head; and said guide rail means being made of molded resin and defining a tip thereon which defines coupling means for coupling said guide rail means to said positioning means when said sub-chassis and guide rail means have been moved by said drive mechanism towards said rotary head drum.

* * * * *